United States Patent
Albrecht

[11] Patent Number: 6,096,354
[45] Date of Patent: *Aug. 1, 2000

[54] PROCESS FOR ASEPTICALLY PACKAGING PROTEIN-CONTAINING MATERIAL AND PRODUCT PRODUCED THEREBY

[75] Inventor: David D. Albrecht, Englewood, Ohio

[73] Assignee: The Iams Company, Dayton, Ohio

[*] Notice: Under 35 U.S.C. 154(b), the term of this patent shall be extended for 107 days.

[21] Appl. No.: 09/002,323

[22] Filed: Jan. 2, 1998

Related U.S. Application Data

[60] Provisional application No. 60/034,576, Jan. 8, 1997.

[51] Int. Cl.[7] .............................. B65D 55/00; A23J 3/00; A23L 1/317
[52] U.S. Cl. ......................... 426/129; 426/399; 426/513; 426/519; 426/520
[58] Field of Search .................................. 426/520, 399, 426/511, 519, 513, 129

[56] References Cited

U.S. PATENT DOCUMENTS

| | | | |
|---|---|---|---|
| 3,857,986 | 12/1974 | Svendsen | 426/371 |
| 3,928,640 | 12/1975 | Stahler | 426/465 |
| 3,976,799 | 8/1976 | Kelly, Jr. et al. | 426/34 |
| 4,048,342 | 9/1977 | Haas et al. | 426/129 |
| 4,212,894 | 7/1980 | Franzen, Jr. et al. | 426/332 |
| 4,233,320 | 11/1980 | Monaco et al. | 426/7 |
| 4,378,379 | 3/1983 | Liesaus | 426/272 |
| 4,446,161 | 5/1984 | Friedman et al. | 426/335 |
| 4,539,212 | 9/1985 | Hunter | 426/325 |
| 4,560,567 | 12/1985 | Rausing | 426/399 |
| 4,560,570 | 12/1985 | Rausing et al. | 426/564 |
| 4,572,839 | 2/1986 | Guitteny et al. | 426/646 |
| 4,731,978 | 3/1988 | Martensson | 53/468 |
| 4,734,287 | 3/1988 | Singer et al. | 426/41 |
| 4,748,028 | 5/1988 | McKenna et al. | 426/130 |
| 4,781,939 | 11/1988 | Martin et al. | 426/646 |
| 4,789,556 | 12/1988 | Okonogi et al. | 426/573 |
| 4,851,243 | 7/1989 | Andersen et al. | 426/74 |
| 4,882,188 | 11/1989 | Sawada et al. | 426/438 |
| 5,374,437 | 12/1994 | Sato | 8/148 |
| 5,431,939 | 7/1995 | Cox et al. | 426/300 |
| 5,470,597 | 11/1995 | Mendenhall | 426/521 |
| 5,472,725 | 12/1995 | Mendenhall | 426/521 |
| 5,537,916 | 7/1996 | Lagares-Corominas | 99/356 |
| 5,567,466 | 10/1996 | Dupont-Delhovren | 426/641 |
| 5,792,498 | 8/1998 | Palaniappan et al. | 426/520 |
| 5,792,504 | 8/1998 | Poppel et al. | 426/646 |

FOREIGN PATENT DOCUMENTS

| | | |
|---|---|---|
| 0 312 514 A2 | 4/1989 | European Pat. Off. . |
| 2 116 826 | 10/1983 | United Kingdom . |

*Primary Examiner*—Nina Bhat
*Attorney, Agent, or Firm*—Killworth, Gottman, Hagan & Schaeff LLP

[57] ABSTRACT

A protein-containing composition is provided which is produced by the steps of: coagulating a protein-containing material; emulsifying the protein-containing material; continuously heating the protein-containing material to a predetermined temperature and maintaining that temperature for a period of time sufficient to sterilize the protein-containing material; continuously cooling the protein-containing material; and aseptically packaging the protein containing material. The resulting product is a high quality, highly palatable, and highly digestible protein source which can be shipped without special accommodations regardless of temperature.

50 Claims, 2 Drawing Sheets

PROCESS FOR ASEPTICALLY PACKAGING PROTEIN-CONTAINING MATERIAL AND PRODUCT PRODUCED THEREBY

CROSS REFERENCE TO RELATED APPLICATIONS

This patent application claims the benefit of U.S. Provisional Application Serial No. 60/034,576, filed Jan. 8, 1997.

BACKGROUND OF THE INVENTION

This invention relates to (a) a treatment of a meat/protein-containing material before thermal processing and (b) a process for aseptically processing and packaging such material to become shelf stable. More specifically, this invention relates to a process for aseptically processing and packaging meat such as, for example, beef, pork, poultry (for example, chicken, turkey, duck, and goose), lamb, and goat, as well as shellfish and fish protein, and the resulting aseptically-packaged product.

Through the years, a wide variety of techniques have been developed for storing food products. Among these techniques are freezing, canning, irradiation, and drying. Also, attempts have been made in the past to store food products using aseptic packaging.

Aseptic packaging allows food products to be stored at room temperature for extended periods of time without spoiling or degradation of the product. These benefits are the result of processing the food product to destroy any sources of decay such as thermophilic spores or other pathogens. The product is then placed in protective packaging which has also been made aseptic. This packaging, when sealed, provides a barrier against oxygen and light as well as any later possible invasion by harmful organisms or pathogens.

Aseptic packaging techniques have been effectively used to package vegetable matter. However, attempts to package meat and fish protein using aseptic techniques have been commercially unsuccessful. In many cases, the processed protein is unpalatable. Also, previous attempts (to aseptically package meat/protein have not removed fat or water from the product) have resulted in little benefit compared to other food storage techniques.

Therefore, a need still exists for a process for aseptically packaging protein which will result in a high quality, commercially useful protein source, which has high digestibility and palatability.

SUMMARY OF THE INVENTION

The present invention meets that need by providing a process for aseptically packaging protein, particularly meat protein, which is commercially useful, and the product produced thereby. The processed protein can be concentrated by adjusting the percentage of fat and water from the original protein source. The protein is then cut into uniform-sized particles and sterilized. The sterilized protein is aseptically packaged. The resulting product is a high quality, highly palatable, and highly digestible protein source which can be shipped without special accommodations regardless of temperature. Also, when the amount of fat and water in the original meat is changed, the packaged product is an efficient means for shipping large quantities of meat protein long distances. In addition, the product of the present invention is economically beneficial because it is or can be lighter (lower transportation costs) and can take up less storage space (lower storage costs) than the original meat.

In accordance with one aspect of the present invention, a protein-containing composition is provided which is produced by the steps of: coagulating a protein-containing material; emulsifying the protein-containing material; heating the protein-containing material to a predetermined temperature and maintaining that temperature for a period of time sufficient to sterilize the protein-containing material; cooling the protein-containing material; and aseptically packaging the protein containing material. Preferably, the steps of the process are carried out on a continuous basis.

The protein-containing material may include any coagulable protein such as meat, poultry (for example, chicken, turkey, duck, or goose), pork, beef, lamb, and goat, fish, shellfish, or combinations thereof. Preferably, the protein-containing material is meat, poultry or fish. More preferably, the protein-containing material is meat. The protein-containing material may be, but is not necessarily deboned prior to coagulation. The period of time needed to effect sterilization will depend upon the temperature chosen. Preferably, the material is heated to a temperature of about 250° F. to about 300° F. (about 120° C. to about 150° C.) and held at that temperature for about 1 to about 360 seconds, is sufficient.

In accordance with a second aspect of the present invention, a protein-containing composition is provided which is produced by the steps of: coagulating a protein-containing starting material; separating the starting material to produce a protein-containing portion and a fat-containing portion; mixing the protein-containing portion with fat to produce a mixed product; emulsifying the mixed product; heating the mixed product for a sufficient period of time to sterilize the mixed product; cooling the mixed product; and aseptically packaging the mixed product. Preferably, the steps of the process are carried out on a continuous basis.

The protein-containing starting material may be any coagulable protein, and preferably is meat. In a preferred embodiment, a stick water portion of broth is produced during the separating step. The broth may be concentrated and mixed back with the protein and fat to form the mixed product. Also, the protein containing material may be deboned prior to coagulating.

Preferably, the mixed product is heated to a temperature of at least 250° F. (120° C.). More preferably, the mixed product is heated to a temperature from about 250° F. to about 300° F. (about 120° C. to about 150° C.).

Preferably, the mixed product is heated for about 1 second to about 360 seconds. More preferably, the mixed product is heated for about 10 to about 60 seconds, and most preferably heated for about 20 to about 40 seconds. In addition, the fat added in the mixing step is preferably taken from the fat-containing portion from the separating step.

In accordance with a third aspect of the present invention, a process for producing a protein-containing composition is provided including the steps of: coagulating a protein-containing starting material; separating the starting material to produce a protein-containing portion and a fat-containing portion; mixing the protein-containing portion with fat to produce a mixed product; emulsifying the mixed product; heating the mixed product for a sufficient period of time to sterilize the mixed product; cooling the mixed product; and aseptically packaging the mixed product. Preferably, the steps of the process are carried out on a continuous basis.

Again, the protein-containing starting material may comprise any coagulable protein and preferably is meat. In a preferred embodiment, a stick water portion of broth is produced during the separating step. The broth may be concentrated and added to the protein and fat during the mixing step. Also, the protein containing material is preferably deboned prior to coagulating.

Preferably, the mixed product is heated to a temperature of at least 250° F. (120° C.). More preferably, the mixed product is heated to a temperature from about 250° F. to about 300° F. (about 120° C. to about 150° C.).

Preferably, the mixed product is heated for from about 1 second to about 360 seconds. More preferably, the mixed product is heated for from about 10 to about 60 seconds, and most preferably the mixed product is heated for from about 20 seconds to about 40 seconds. In addition, the fat added in the mixing step is preferably taken from the fat-containing portion.

In yet another embodiment of the invention, a protein-containing composition is provided which is produced by the process of providing a pumpable a protein-containing material, sterilizing said protein-containing material by exposing said protein-containing material to irradiation for a time sufficient to sterilize the protein-containing material, and aseptically packaging the protein-containing material. Preferably, the steps of the process are carried out on a continuous basis.

Accordingly, it is a feature of the present invention to provide a process for aseptically packaging protein-containing material which provides a high quality, sterile, highly palatable, highly digestible, easy to transport protein source which can be stored easily and economically.

DETAILED DESCRIPTION OF THE PREFERRED EMBODIMENTS

The present invention produces an improved aseptically packaged protein-containing product which has numerous benefits. First, the product can be transported and stored for prolonged periods of time. The product is relatively temperature insensitive, allowing it to be stored at temperatures ranging from the freezing point of the product to higher temperatures (100° F. or higher) without noticeable quality changes. Therefore, the product of the present invention can be shipped to cold or hot environments without requiring any special handling or storage.

In addition, the present invention produces a product with a reduced or increased fat and/or water/broth content. This can result in significantly lower shipping and storage costs. For example, a buyer, seller or producer in any location can aseptically process protein. The protein is processed without the aid of freezing technology. The product can be stored at ambient temperatures for long periods of time and shipped in a non-refrigerated mode. The liquid/broth phase can be concentrated in order to reduce the shipment and/or storage of water. The packaged protein will be of a consistent nature, with protein, fat, and water content being consistent from package to package. The protein can be stored for a year or more. This results in significant savings with regard to manufacturing, storage, transportation and handling costs.

The present invention has further benefits. Meat particles processed by the present invention may have amino acid and/or vitamin levels which are very close to the amino acid and vitamin levels in the original meat. This is significant, since many prior art preservation processes destroy large quantities of amino acids and vitamins. For example, traditional in-package sterilization in retorts can greatly reduce the amount of the amino acids and vitamins in canned meat. With the process of the present invention, on the other hand, it is possible to retain a high percentage of the original amino acid/vitamin content of the meat. Amino acids are the "building blocks" of proteins. Therefore, meat particles with high amino acid and vitamin levels are a better nutritional source than meats with lower quantities of amino acids and vitamins. In addition, the processed meat product of the present invention has better palatability and digestibility than meat processed by other techniques.

Figure 1:
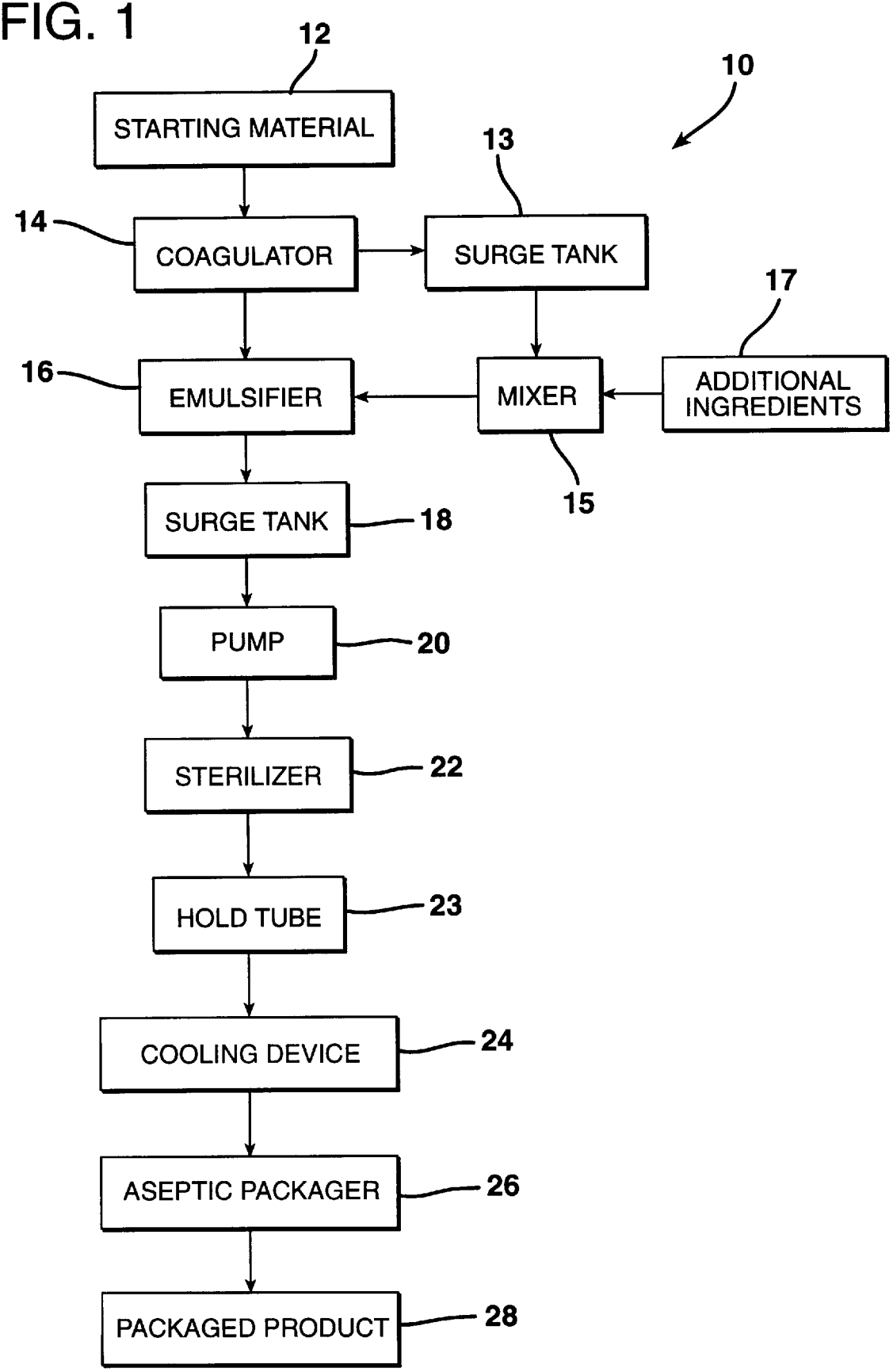
FIG. 1 is a flow chart demonstrating a first embodiment of the process of the present invention.

Referring now to FIG. 1, a schematic diagram of an embodiment of the process of the present invention is shown. The process 10 is a continuous process and uses a protein-containing starting material 12. The starting material 12 contains wet proteins (uncoagulated proteins). Useful starting materials include meat, poultry (for example, chicken, turkey, goose, or duck), pork, beef, lamb, and goat, fish, shellfish, and combinations thereof. Preferably, the starting material is either meat or fish. More preferably, the starting material is meat. Most preferably, the starting material is lamb meat.

The starting material 12 is placed in a coagulator 14. The coagulator 14 coagulates the material to produce a more uniform mass. The coagulator 14 can use heat (direct or indirect) or coagulating agents to effect coagulation. Preferably, a steam injection or indirect coagulator is used.

The coagulated material is transferred to an emulsifier 16. A useful emulsifier 16 is a Wolfking Emulsifier, commercially available from Wolfking Inc. The emulsifier 16 is used to break down the protein-containing particles into substantially uniform-sized pieces. The average diameter of the uniform-sized pieces may vary. Preferably, the average diameter of the uniform-sized pieces is from about 1 mm to about 2 mm. More preferably, the average diameter of the uniform-sized pieces is about 1.6 mm. If the average diameter of the uniform-sized pieces is larger, the temperature and/or hold time of the pieces in the sterilizer will need to be adjusted in order to eliminate all "cool spots."

Alternatively, material from coagulator 14 may be transferred to a surge tank 13 and into a mixer 15. In mixer 15, additional ingredients 17 are added such as, for example, vitamins, starches, dry proteins (i.e., proteins which have also been coagulated), minerals, water, and any other organic or inorganic compositions that might be used in a finished product. It is desirable to thoroughly incorporate all such materials in order to achieve a homogeneous mixture. The mixed product is thereafter sent to emulsifier 16.

The substantially uniform-sized pieces from emulsifier 16 are transferred to a surge tank 18. The surge tank 18 provides a holding area where the uniform-sized pieces can be removed at a steady rate. This allows the process to operate more efficiently and aids in the elimination of unwanted air. Also, the surge tank 18 can optionally be equipped to agitate the product. This aids in maintaining a homogenous mixture.

The uniform-sized pieces pass through a pump 20 which propels the pieces into the sterilizer 22. Pumps which are useful in the present invention include, but are not limited to, positive displacement pumps such as lobe pumps and piston pumps. These pumps move the uniform-sized pieces through the pump cavity and into the sterilizer at a consistent rate. A positive displacement pump which is useful in the present invention is commercially available from APV Crepaco, Inc. However, many other commercially available pumps may be used if the type of pump is matched with the viscosity of the product, volume, and product speed through the system.

The uniform-sized pieces are continuously transferred to a sterilizer 22. The sterilizer 22 can use a variety of techniques to sterilize the uniform-sized pieces. For example, the sterilizer 22 can use heat, irradiation, microwaves, chemical treatment, direct or indirect thermal resistance, radio frequency, ohmic, or any other system that will adequately sterilize the meat products. Preferably, the sterilizer 22 uses heat. A preferred sterilizer 22 is a scrape surface heat exchanger, commercially available from APV Crepaco, Inc. The scrape surface heat exchanger consists of a cylindrical space, wherein a rotating blade/auger continuously operates, scraping along the walls of the space so as to remove the product from the walls. In the case of the sterilizer 22, the walls are hot due to being externally heated.

Preferably, the uniform-sized pieces are heated in the sterilizer 22 to a temperature which is sufficient to kill pathogens. The uniform sized pieces are heated to a particular temperature and held at or above that temperature for a period of time which is sufficient to kill pathogens. The desired temperature and "hold time" (the amount of time the product is maintained at or above a particular temperature) may vary according to the desired results.

Preferably, the uniform-sized pieces are heated to a temperature of at least 250° F. (120° C.). More preferably, the uniform sized pieces are heated to a temperature from about 250° F. to about 300° F. (about 120° C. to about 150° C.). Also, the uniform-sized pieces are preferably held at the desired temperature in a hold tube 23 for at least 1 second. More preferably, the uniform-sized pieces are held at the desired temperature for from about 20 seconds to about 40 seconds. Most preferably, the uniform-sized pieces are heated to a temperature of 275° F. (135° C.) for 20 seconds.

The product passes from the sterilizer 22 into the hold tube 23. The function of the hold tube 23 is to hold the product at or above a specific temperature for a specific amount of time. This provides a means for ensuring that pathogens have been killed. A preferred temperature and hold time is 275° F. (135° C.) for 20 seconds.

The product passes from the hold tube 23 into a continuous cooling device 24, where the product is cooled and the cooking process is stopped. A preferred cooling device is a scrape surface heat exchanger, commercially available from APV Crepaco, Inc. The scrape surface heat exchanger consists of a cylindrical space, wherein a rotating blade/auger continuously operates, scraping along the walls of the space so as to remove the product from the walls. In the case of the cooling device 24, the walls are cold due to being externally cooled.

In another embodiment of the invention, sterilizer 22 uses irradiation rather than heat to sterilize the product. Where irradiation is used, the coagulation step and the emulsification step of the process are optional, as long as the product which is supplied to sterilizer 22 is pumpable. No cooling step is required.

The product passes from the cooling device 24 into an aseptic packager 26. The aseptic packager 26 operates by using steam or hydrogen peroxide in combination with steam to clean and sterilize the spouts. The spouts are sterilized at a temperature high enough to kill pathogens. The product passes through the sterilized spouts into containers. The type of container used may vary from a 2500 lb. high barrier material bag or container to a single serving cup. Preferably, a large high barrier material bag or container or foil barrier bag is used. The aseptic packager 26 then injects the sterilized protein-containing product into the bags, resulting in a packaged product 28.

Figure 2:
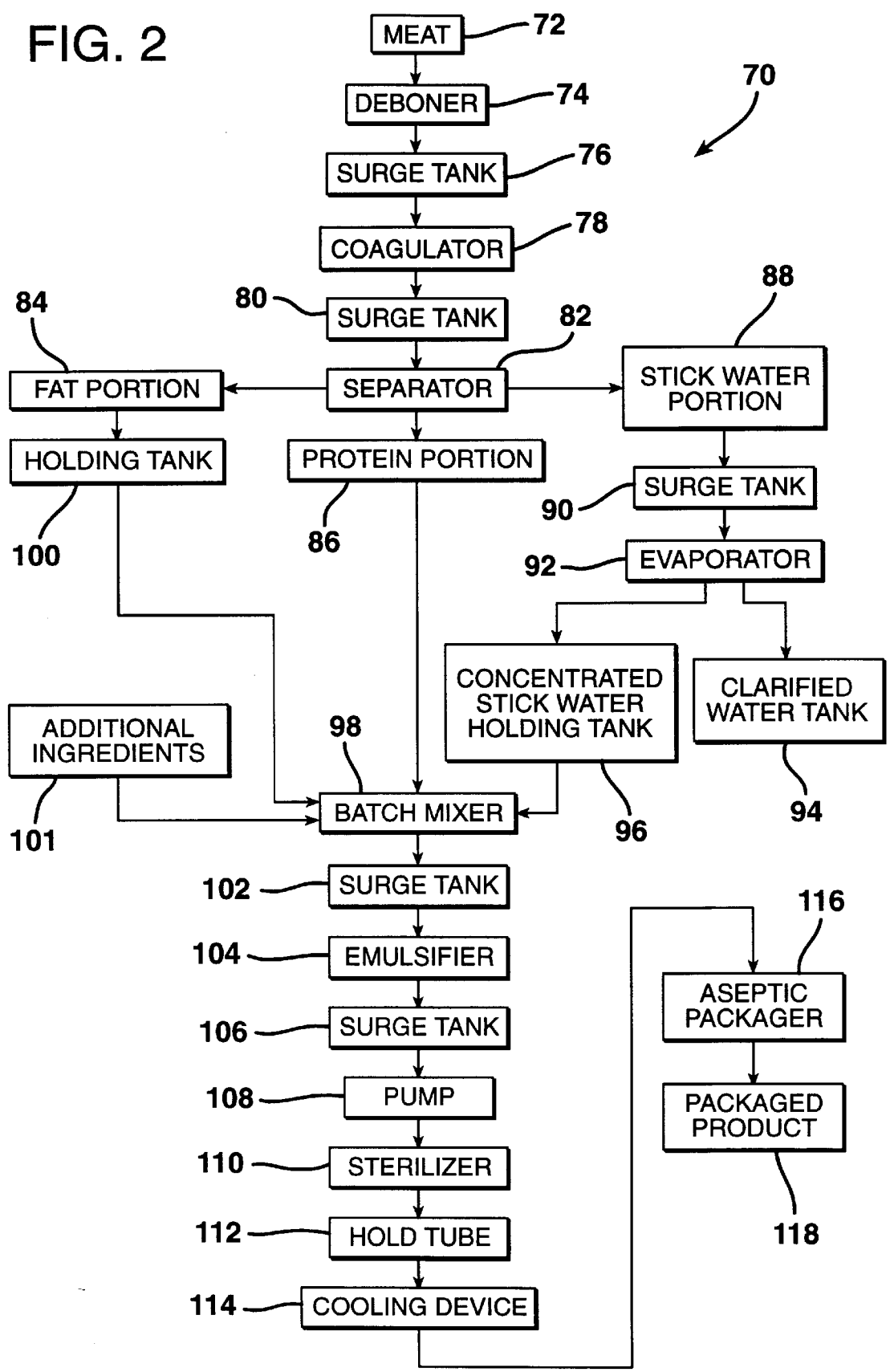
FIG. 2 is a flow chart demonstrating a second embodiment of the process of the present invention.

Referring now to FIG. 2, a schematic diagram of a second embodiment of the process of the present invention is shown. The process 70 is also preferably continuous and uses a protein-containing starting material such as meat 72. Preferably, the meat is lamb meat.

Optionally, the meat 72 may be placed in a deboner 74 to remove the bones from the material. A useful deboner is a BEEHIVE™ deboner, commercially available from Beehive Machinery, Inc. The deboner 74 operates by pushing the soft material against a screen, allowing the soft material through the screen while hard materials such as bones are separated. The resulting material has the consistency of ground meat.

The deboned material is transported to a surge tank 76. Surge tank 76 provides a holding area where the deboned material can be removed at a steady rate. This allows the process to operate more efficiently.

The deboned material is transferred from the surge tank 76 to a coagulator 78. The coagulator 78 coagulates the material to produce a more uniform mass. The coagulator 78 can use heat (direct or indirect) or coagulating agents to effect coagulation. Preferably, a steam injection or indirect coagulator is used. The material should be heated to a temperature for from about 160° F. to about 230° F. about 71° C. to about 110° C. and held at that temperature for from about 10 to about 300 seconds. Various combinations of temperature and time may be used as long as the material is fully coagulated. The coagulated material is then transferred to a surge tank 80.

The coagulated material is transferred from the surge tank 80 to a separator 82. A device using centrifugal force or a press may be used to separate the liquid from the solid phase of the coagulated material. The separator 82 separates the coagulated material into at least two, and preferably three portions, a fat-containing portion 84, a protein-containing portion 86, and a stick water/broth containing layer 88. "Stick water" is a liquid phase that contains protein and may also contain fat. It may also be called broth and may contain water soluble fat and protein. The separation of the material into three phases allows for the recombination of these materials at a desired quantity and rate. A useful separator is a Three Phase Decanter, commercially available from Westfalia Separator, Inc. A useful press is a Dupps press, commercially available from the Dupps Company. The fat portion 84 contains a majority of the fat from the meat 72. The protein portion 86 contains a majority of the protein from the meat 72. The stick water portion 88 contains a significant part of the water from the meat 72, as well as some soluble fat and protein.

The fat portion 84 is transferred to a holding tank 100. The separation of the fat portion 84 allows for the control of precise proportions of protein, fat and moisture in the final product. Therefore, the portion of the fat 84 which is transferred to the batch mixer 98 is dependent upon the fat content of the starting material and the desired fat content in the final product. The remainder of the fat portion 84 is removed from the holding tank 100 and used for other purposes. From about 0 to about 100 percent of the fat portion 84, and typically 100 percent, is transferred to the batch mixer 98.

The stick water portion 88 is transferred to the surge tank 90. From the surge tank 90, the stick water portion 88 passes into an evaporator 92. The evaporator 92 uses heat and/or a vacuum to evaporate clarified water from the stick water portion 88. The clarified water is stored in the clarified water tank 94. The clarified water contains essences from the starting material. Such essences may be added back into this or other mixed products as an odorant, attractant, or palatizing agent, either with or without further concentration. The remaining liquid is a concentrated broth containing a higher percentage of solids, which passes into a concentrated stick water holding tank 96. The concentration of solids depends upon the type of equipment and the desired concentration level. For example, the stick water layer 88 may contain 2 to 6 percent solids, while the concentrated broth may contain 25 percent or more solids. Preferred evaporators are plate, falling film, and rising film evaporators, or any other concentrator/evaporator that will raise the solids content of the liquid. Preferably, a plate evaporator is used. A plate evaporator operates by passing liquid over a heated surface.

The protein portion 86 is sent to a holding tank (not shown) and thereafter is combined with the broth and part of the fat portion 84 in a batch mixer 98. The batch mixer 98 can combine the protein portion 86, the fat portion 84 and the concentrated stick water portion 96 to produce a variety of ingredient percentages. Ingredient percentages will be consistent for a given run. Percentages of ingredients can be varied widely depending upon the desired final product. Preferably, the mixed product contains from about 10 to about 40 percent protein, from about 30 to about 60 percent water, from about 10 to about 60 percent fat, and from about 0 to about 5 percent ash.

While the portions are recombined in this embodiment, it may not be necessary to recombine the protein portion 86 with either the fat portion 84 or the stick water portion 88 so long as the protein portion flows properly. The protein portion 86 can be processed alone. Alternatively, outside sources of fat and/or water may be combined with the protein portion using the batch mixer 98. Also, additional ingredients 101 may be combined with the protein, fat, and broth portions using the batch mixer 98. Additional ingredients 101 include vitamins, starches, dry proteins (these are proteins which have been coagulated), minerals, water, or any other organic or inorganic compositions that might be used in a finished product. It is desirable to thoroughly incorporate all such materials in the batch mixer 98 in order to achieve a homogeneous mixture.

The mixed product is transferred from the mixer 98 to a surge tank 102 and then to an emulsifier 104. A useful emulsifier 104 is a Wolfking Emulsifier, commercially available from Wolfking Inc. The emulsifier 104 is used to break down the mixed product into substantially uniform-sized pieces. The average diameter of the uniform-sized pieces may vary. Preferably, the average diameter of the uniform-sized pieces is from about 1 mm to about 2 mm. More preferably, the average diameter of the uniform-sized pieces is about 1.6 mm. If the average diameter of the uniform-sized pieces is larger, the temperature and/or hold time of the pieces in the sterilizer and hold tube will need to be adjusted.

The substantially uniform-sized pieces are transferred to a surge tank 106. The surge tank 106 provides a holding area where the uniform-sized pieces can be removed at a steady rate. This allows the process to operate more efficiently. The uniform-sized pieces pass through a pump 108 which propels the pieces into the sterilizer 110. A pump which is useful in the present invention uses positive displacement to move the uniform-sized pieces through the pump and into the sterilizer at a very consistent rate without adding air to the product. A pump using positive displacement is commercially available from APV Crepaco, Inc. However, many other commercially available pumps may be used if their settings are matched with the viscosity of the product volume and product speed through the system.

The uniform-sized pieces are transferred to a sterilizer 110. The sterilizer 110 can use a variety of techniques to sterilize the uniform-sized pieces. For example, the sterilizer 110 can use heat, irradiation, microwaves, chemical treatment, direct or indirect thermal resistance, radio frequency, ohmic, or any other system which will adequately sterilize the product. Preferably, the sterilizer 110 uses heat. A preferred sterilizer 110 is a scrape surface heat exchanger, commercially available from APV Crepaco, Inc. The scrape surface heat exchanger consists of a cylindrical space, wherein a rotating blade/auger continuously operates, scraping along the walls of the space so as to remove the product from the walls. In the case of the sterilizer 110, the walls are hot due to being externally heated.

Preferably, the uniform-sized pieces are heated in the sterilizer 110 to a temperature which is sufficient to kill pathogens. The uniform sized pieces are heated to a particular temperature and held at or above that temperature for a period of time which is sufficient to kill pathogens. The desired temperature and "hold time" (the amount of time the product is maintained at or above a particular temperature) may vary according to the desired results.

Preferably, the uniform-sized pieces are heated to a temperature of at least 250° F. (120° C.). More preferably, the uniform sized pieces are heated to a temperature from about 250° F. to about 300° F. (120° C. to about 150° C.). Also, the uniform-sized pieces are preferably held at the desired temperature in a hold tube 112 for at least 1 second. More preferably, the uniform-sized pieces are held at the desired temperature for from about 20 seconds to about 40 seconds. Most preferably, the uniform-sized pieces are heated to a temperature of 275° F. (135° C.) for 20 seconds.

The product passes continuously from the sterilizer 110 into the hold tube 112. The function of the hold tube 112 is to hold the product at or above a specific temperature for a specific amount of time. This provides a means for ensuring that pathogens have been killed. A preferred temperature and hold time is 275° F. (135° C.) for 20 seconds.

The product is transferred from the hold tube 112 to the continuous cooling device 114, where the product is cooled. A preferred cooling device is a scrape surface heat exchanger as previously described or any other mechanism which cools aseptically. In the case of the cooling device 114, the walls are cold due to being externally cooled.

Again, in an alternative embodiment, sterilizer 110 utilizes irradiation for a time sufficient to sterilize the product. Where irradiation is used, the coagulation and emulsification steps of the process are optional, as long as the product is pumpable. No cooling step is required.

The product continuously passes from the cooling device 114 into an aseptic packager 116. The aseptic packager 116 operates by using steam or hydrogen peroxide in combination with steam to clean and sterilize the spouts. The spouts are sterilized at a temperature high enough to kill pathogens. The product passes through the sterilized spouts into containers. The type of container used may vary from a 2500 lb. high barrier material bag or container to a single serving cup, with a large, high barrier material bag or foil barrier bag being preferred. The aseptic packager 116 then injects the sterilized protein-containing product into the bags, resulting in a packaged product 118.

The aseptically packaged product of the present invention can be shipped and then processed at its final destination, and fat and/or water may be reintroduced. All of the original protein source may be aseptically packaged. Preferably, about 40–70 percent of the original product is present in the packaged product. The other products (the additional fat and stick water) may be aseptically packaged separately.

The packaged product may be stored at a variety of temperatures ranging from the freezing point of the product to higher temperatures (100° F. and higher) without noticeable quality changes. However, ambient temperatures for storage are preferred. Note that the freezing point of the product is considered a limitation only due to concerns regarding the breakdown of package integrity. The concern is that water in the product will freeze and expand, breaking the container. Therefore, if the packaging material can withstand such expansion of the product, the product can be stored at very low temperatures, well below the freezing point of the product.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An aseptically packaged, protein-containing composition produced by the steps comprising: coagulating a protein-containing material; emulsifying said protein-containing material; heating said protein-containing material to a predetermined temperature and maintaining said temperature for a period of time sufficient to sterilize said protein-containing material; cooling said protein-containing material; and aseptically packaging said protein-containing material.

2. A composition as claimed in claim 1 in which said protein-containing material is selected from the group consisting of meat, poultry (chicken, turkey, duck, or goose), pork, beef, lamb, and goat, fish, shellfish, and combinations thereof.

3. A composition as claimed in claim 1 wherein said protein-containing material is selected from the group consisting of meat, poultry and fish.

4. A composition as claimed in claim 1 in which said protein-containing material is heated to a temperature of from about 250° F. to about 300° F. (120° C. to about 150° C.) and held at that temperature for from about 1 to about 360 seconds.

5. A composition as claimed in claim 1 further comprising deboning said protein-containing material prior to coagulating.

6. An aseptically packaged, protein-containing composition produced by the steps comprising:
   (a) coagulating the food product in a coagulator to form a coagulated food product;
   (b) emulsifying the coagulated food product in an emulsifier to form an emulsified food product;
   (c) blending the emulsified food product in a kettle to create a pumpable food product; and
   (d) aseptically processing the pumpable food product through a plurality of heat exchangers to preheat the food product to a predetermined temperature sufficient to create an aseptically processed food product.

7. A method for aseptically processing a homogenous food product, the method comprising the steps of:
   coagulating the food product in a coagulator to form a coagulated food product;
   emulsifying the coagulated food product in an emulsifier to form an emulsified food product;
   blending the emulsified food product in a kettle to create a pumpable food product; and
   aseptically processing the pumpable food product through a plurality of heat exchangers to preheat the food product to a predetermined temperature sufficient to create an aseptically processed food product.

8. An aseptically packaged, homogenous food product produced according to the method of claim 7.

9. A method for aseptically processing a homogenous food product, the method comprising the steps of:
   (a) providing a homogenous food product to be aseptically processed;
   (b) coagulating the food product in a coagulator to form a coagulated food product;
   (c) emulsifying the coagulated food product in an emulsifier to form an emulsified food product;
   (d) blending the emulsified food product in a kettle to create a pumpable food product; and
   (e) aseptically processing the pumpable food product through a plurality of heat exchangers to preheat the food product to a predetermined temperature sufficient to create an aseptically processed food product.

10. The method according to claim 9 wherein the step of coagulating comprises the steps of:
    (a) pressurizing the coagulator and (b) heating the coagulator to a temperature of least 80° C.

11. The method according to claim 10 wherein the step of heating the coagulator is accomplished through steam injected into the coagulator.

12. The method according to claim 9 and further comprising the step of aseptically packaging the aseptically processed food product.

13. The method according to claim 9 wherein the step of aseptically processing the pumpable food product comprises subjecting the pumpable food product to a temperature of about 120° C. to about 150° C. for a period of time from about 1 second to about 360 seconds.

14. The method according to claim 9 wherein the food product is a thawed food product.

15. An aseptically packaged, homogenous food product produced according to the method of claim 9.

16. A method for aseptically processing a homogenous meat product, the method comprising the steps of:
    (a) providing a homogenous meat product to be aseptically processed;
    (b) coagulating the homogeneous meat product in a coagulator to create a coagulated meat product;
    (c) emulsifying the coagulated meat product in an emulsifier to form an emulsified meat product and to emulsify fat associated with the coagulated meat product;
    (d) blending the emulsified meat product in a kettle to create a pumpable meat product; and
    (e) aseptically processing the pumpable meat product through a plurality of heat exchangers to preheat the pumpable meat product to a predetermined temperature sufficient to create an aseptically processed meat product.

17. The method according to claim 16 wherein the step of coagulating comprises the steps of:
    (a) pressurizing the coagulator and
    (b) heating the coagulator to a temperature of at least 70° C.

18. The method according to claim 17 wherein the step of heating the coagulator is accomplished through steam injected into the coagulator.

19. The method according to claim 16 and further comprising the step of aseptically packaging the aseptically processed meat product.

20. The method according to claim 16 wherein the step of aseptically processing the pumpable meat product comprises subjecting the pumpable meat product to a temperature of at least 133° C. for a time period of at least 20 seconds.

21. The method according to claim 16 wherein the meat product is a thawed meat product.

22. An aseptically packaged, homogenous meat product according to the method of claim 16.

23. A method for creating a pumpable homogenous meat product for aseptic processing, the method comprising the steps of:
(a) providing a homogenous meat product;
(b) placing the homogenous meat product into a coagulator;
(c) coagulating the homogenous meat product through pressurizing the coagulator and heating the coagulator to a temperature in excess of 90° C. to create a coagulated meat product;
(d) emulsifying the coagulated meat product in an emulsifier to form an emulsified meat product and to emulsify fat associated with the coagulated meat product;
(e) blending the emulsified meat product in a kettle to create a pumpable homogenous meat product for aseptic processing;
(f) aseptically processing the pumpable homogeneous meat products by:
  (i) heating the pumpable homogenous meat product to a predetermined temperature and
  (ii) maintaining the pumpable homogeneous meat product at the predetermined temperature for a predetermined period,
(g) whereby the steps of coagulating, emulsifying, and blending prevent the pumpable homogenous meat product from coagulating during the step of aseptically processing the pumpable homogenous meat product.

24. The method according to claim 23 wherein the coagulator is heated by steam.

25. The method according to claim 23 wherein the homogenous meat product is a thawed meat product.

26. The method according to claim 23 wherein the pumpable homogenous meat product is heated to a temperature of at least 133° C. for a minimum time period of 20 seconds.

27. The method according to claim 23 wherein the homogenous meat product is selected from the group consisting of lamb and beef.

28. The method according to claim 23 further comprising the step of aseptically packaging the aseptically processed meat product.

29. The method according to claim 23 wherein the meat product is subject to a temperature of about 120° C. to about 150° C. for a period of time of about 1 second to about 360 seconds.

30. An aseptically packaged, homogenous meat product according the method of claim 23.

31. A method for creating a pumpable homogenous food product for aseptic processing, the method comprising the steps of:
(a) providing a homogenous food product;
(b) placing the homogenous food product into a coagulator and heating the food product to a temperature of about 71° C. to about 110° C. to create a heated food product;
(c) coagulating the heated food product to create a coagulated food product;
(d) emulsifying the coagulated food product in an emulsifier to form an emulsified, pumpable food product;
(e) aseptically processing the emulsified, pumpable food product by:
  (i) heating the emulsified, pumpable food product at a predetermined temperature and
  (ii) maintaining the emulsified, pumpable food product at the predetermined temperature for a predetermined time period,
(f) whereby the steps of coagulating and emulsifying prevent the pumpable food product from coagulating during the step of aseptically processing the emulsified, pumpable food product.

32. The method according to claim 31 wherein the homogenous food product is selected from the group consisting of lamb and beef.

33. The method according to claim 31 further comprising the step of aseptically packaging the aseptically processed meat product.

34. The method according to claim 31 wherein the pumpable food product is subject to a temperature of about 120° C. to about 150° C. for a period of time of about 1 second to about 360 seconds.

35. An aseptically packaged, homogenous food product produced according to the method of claim 31.

36. An aseptically packaged, protein-containing composition produced by the steps comprising:
(a) coagulating the food product in a coagulator to form a coagulated food product;
(b) emulsifying, the coagulated food product in an emulsifier to form an emulsified food product;
(c) blending the emulsified food product in a kettle to create a pumpable food product;
(d) aseptically processing the pumpable food product through a plurality of heat exchangers to preheat the food product to a predetermined temperature; and
(e) maintaining said predetermined temperature for a predetermined time sufficient to create an aseptically processed food product.

37. A method for aseptically processing a homogenous food product, the method comprising the steps of:
(a) coagulating the food product in a coagulator to form a coagulated food product;
(b) emulsifying the coagulated food product in an emulsifier to form an emulsified food product;
(c) blending the emulsified food product in a kettle to create a pumpable food product;
(d) aseptically processing the pumpable food product through a plurality of heat exchangers to preheat the food product to a predetermined temperature; and
(e) maintaining said predetermined temperature for a predetermined time sufficient to create an aseptically processed food product.

38. An aseptically packaged, homogenous food product produced according to the method of claim 37.

39. A method for aseptically processing a homogenous food product, the method comprising the steps of:
(a) providing a homogenous food product to be aseptically processed;
(b) coagulating the food product in a coagulator to form a coagulated food product;
(c) emulsifying the coagulated food product in an emulsifier to form an emulsified food product;
(d) blending the emulsified food product in a kettle to create a pumpable food product;
(e) aseptically processing the pumpable food product through a plurality of heat exchangers to preheat the food product to a predetermined temperature; and (f) maintaining said predetermined temperature for a predetermined time sufficient to create an aseptically processed food product.

40. The method according to claim 39 wherein the step of coagulating comprises the steps of:

(a) pressurizing the coagulator and (b) heating the coagulator to a temperature of least 80° C.

41. The method according to claim 40 wherein the step of heating the coagulator is accomplished through steam injected into the coagulator.

42. The method according to claim 39 and further comprising the step of aseptically packaging the aseptically processed food product.

43. The method according to claim 39 wherein the food product is a thawed food product.

44. An aseptically packaged, homogenous food product according to the method of claim 39.

45. A method for aseptically processing a homogenous meat product, the method comprising the steps of:

(a) providing a homogenous meat product to be aseptically processed;

(b) coagulating the homogeneous meat product in a coagulator to create a coagulated meat product;

(c) emulsifying the coagulated meat product in an emulsifier to form an emulsified meat product and to emulsify fat associated with the coagulated meat product;

(d) blending the emulsified meat product in a kettle to create a pumpable meat product;

(e) aseptically processing the pumpable meat product through a plurality of heat exchangers to preheat the pumpable meat product to a predetermined temperature; and (f) maintaining said predetermined temperature for a predetermined time sufficient to create an aseptically processed meat product.

46. The method according to claim 45 wherein the step of coagulating comprises the steps of:

(a) pressurizing the coagulator and (b) heating the coagulator to a temperature of at least 70° C.

47. The method according to claim 46 wherein the step of heating the coagulator is accomplished through steam injected into the coagulator.

48. The method according to claim 45 and further comprising the step of aseptically packaging the aseptically processed meat product.

49. The method according to claim 45 wherein the meat product is a thawed meat product.

50. An aseptically packaged, homogenous meat product according to the method of claim 45.

* * * * *